United States Patent [19]

McIntosh et al.

[11] 4,318,880

[45] Mar. 9, 1982

[54] METHOD AND APPARATUS FOR FORMING MANHOLE BASES

[76] Inventors: Robert G. McIntosh, 32666 Bevan Ave., Abbotsford, B.C. V2T 1G6; Gary S. McKinney, 4621 River Rd., Delta, B.C. V4K 1R9, both of Canada

[21] Appl. No.: 118,715

[22] Filed: Feb. 5, 1980

[30] Foreign Application Priority Data

Aug. 30, 1979 [CA] Canada .................................. 334782

[51] Int. Cl.[3] .......................... B29C 1/12; B29C 1/14

[52] U.S. Cl. ...................................... 264/267; 249/11; 249/65; 249/145; 249/153; 249/91; 249/178; 264/32; 264/35; 264/263; 264/277; 264/314

[58] Field of Search .................. 264/32, 35, 277, 278, 264/314, 263, 267; 249/10, 11, 12, 65, 91, 145, 153, 178

[56] References Cited

U.S. PATENT DOCUMENTS

| | | | |
|---|---|---|---|
| 2,206,410 | 7/1940 | Lally | 249/65 |
| 2,485,898 | 10/1949 | Mathews et al. | |
| 2,794,233 | 6/1957 | Morton et al. | |
| 2,865,079 | 12/1958 | Marchioli et al. | |
| 3,101,519 | 8/1963 | Smith | 249/65 |
| 3,363,876 | 1/1968 | Moore | 249/145 |
| 4,085,918 | 4/1978 | Wilkerson | 249/11 |
| 4,103,862 | 8/1978 | Moore | 249/145 |
| 4,119,291 | 10/1978 | Polito | 249/11 |

FOREIGN PATENT DOCUMENTS

| | | | |
|---|---|---|---|
| 629846 | 9/1949 | United Kingdom | 249/65 |

*Primary Examiner*—James B. Lowe

*Attorney, Agent, or Firm*—Sughrue, Mion, Zinn, Macpeak and Seas

[57] ABSTRACT

The invention provides for a process for constructing manhole assemblies in an excavation or elsewhere, by the utilization of an outer form, a preformed manhole barrel which is positioned and propped within the outer form pipe stub inserted partially into the inside of the preformed manhole and resting under notches cut into the preformed manhole barrel, inflatable or rigid forms (or both) are used to form simple or complex channels in the concrete which is to be poured. The form ends are adapted to fit into the pipe stub ends or may abut other forms, where complex channels are desired. The forms are carefully positioned to allow for the proper height and grade of the channel in the completed manhole assembly. Concrete is poured and when it is set, the forms are deflated where applicable and removed to be reused.

9 Claims, 11 Drawing Figures

METHOD AND APPARATUS FOR FORMING MANHOLE BASES

BACKGROUND OF THE INVENTION

1. Field of the Invention

This invention relates to an apparatus and a method and process for forming and pouring manhole bases. The process of the invention allows manhole bases to be made watertight by allowing for the vibration of the setting concrete to eliminate entrapped air. In this manner, water porous honey-combed concrete is thereby avoided. Using the process of the invention, pouring, in accordance with this invention, can be done in one application, instead of the usual mutiple cycle of pouring, setting and re-pouring. This one-step pouring results in a wall of uniform colour, and the resulting smooth side walls facilitate water or sewage flow. Wavy-shaped walls that bulge into the water channel and cause flow restrictions are avoided. Cleaning equipment functions better in the smooth sided manhole assemblies made according to the process of the invention. The form materials and apparatus of the invention can be re-used and are thus not wasted. Pipe stub channels need no longer be crudely sculpted by hand, in the setting concrete.

2. Description of the Prior Art

The standard method for erecting a manhole is to first dig the required excavation. A precast manhole barrel is delivered to the work site and workmen notch the base of the barrel to accommodate pipe stubs. The pipe stubs connect with pipes leading into and away from the manhole assembly. In order to make the notch, the manhole barrel wall is notched with a sledge hammer and the reinforcing mesh wire is cut away. The resulting notches fit over the pipe stubs which are pieces of pipe that protrude into the manhole or through its,—if the water course is to be a straight path. The pipe stub portion that protrudes into the manhole has its top half removed. The water passes through the manhole by entering a pipe stub then passing through a connecting channel in the manhole's concrete floor and leaving through a connecting pipe stub.

The pipe stub is set on brick skims that are carefully placed to allow for proper grade and alignment.

The earth is filled or excavated to allow for about a 6 inch clearance under the stubs. Bricks are also piled up in order to support the precast manhole barrel. This barrel is lowered by a backhoe or other means onto the bricks, with the barrel's notches fitting over the pipes or pipe stubs. Concrete is then poured into the centre of the manhole and it is worked out to the periphery of the excavation by workmen. Vibration, to remove entrapped air, is used sparingly or not at all because lack of forms enables the concrete to escape down the pipe which becomes difficult to retrieve. The channel between pipe stubs is made by hand-scooping, and rough-shaping of the benching. It is almost impossible to achieve required uniform shape and size in manholes that require compound curves. Hand-shaping is just too crude. Workmen must usually rough bench the initial pour, allow it to set and then build up the required benching with successive pours of concrete. This method results in unsightly, multicoloured layers of concrete, and the stratified vertical walls are usually wavy and tend to bulge. The bulges can impede water flow, cause restrictions and may impede cleaning equipment. Patching that is less than 2 inches thick can crack in warm weather and chip off due to subsequent, normal water flow.

Concrete that is not properly vibrated, tends to be honeycombed and may not be water tight, necessitating subsequent patching with mortar.

The bricks supporting manhole barrels in excavations often sag when the bricks sink into the soil causing the manhole assembly to tilt. In assemblies over 10 feet, the tilt is noticeable and cause the access ladders to become tilted from vertical. Subsequent rectification efforts are expensive, and time consuming. The pool of workmen skilled in pouring and sculpting concrete manhole bases are rapidly diminishing.

Some contractors use plywood (usually ¾ inch) to line the excavation's outer limits and to shape the channels. These forms, though an improvement, require considerable time to cut, fit and brace into place. The form is usually discarded, after the job, because manholes are rarely uniform and are usually unique to each excavation. The plywood form is often damaged during its removal and is rendered unusable for future jobs. Plywood forms generally cannot withstand the pressures attending concrete vibration, thus, concrete vibration is deleted or used sparingly. Many work sites have very poor soil that cannot support wheeled concrete delivery trucks making in situ manhole construction impossible.

Some manhole assembles are prefabricated, and shipped to the work site. These assembles are made with a one foot barrel and a poured concrete base. Fibre glass forms are used for the purpose of concrete pouring. The size of the manholes are thus limited in variety and there are problems fitting the standard connections in situ.

SUMMARY OF THE INVENTION

The present invention provides for a process for making manhole assembles which does not require men skilled in the art of concrete finishing of manhole bases.

The process of the invention allows for the inclusion of complex channels in the manhole assembly between pipe stubs. The channel walls are smooth, and are constructed in one pouring of concrete, and thus not layered with its usual attendant bulging wavy walls. Hand-scooping of concrete and subsequent hand-shaping are avoided.

The process of the invention may be done in the manhole excavation or done at another site, and the finished manhole assembly is subsequently delivered and placed into the excavation. The form-making materials of the process of the invention may be reused in the manufacture of other manhole assemblies. The materials used in the process of this invention can withstand the vibration—used to eliminate entrained air in the poured concrete. Honey-combed concrete is, usually, thus avoided and the manhole assembly is thus water tight. Expensive grouting of leaking concrete is thus avoided.

These and other advantages of the present invention will be seen upon reading the following specification and viewing the drawings, which form a part of this application.

BRIEF DESCRIPTION OF THE INVENTION

Figure 4:
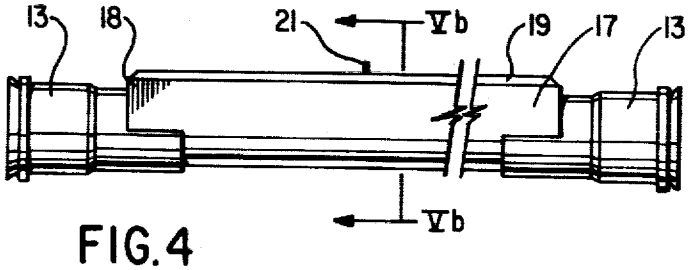
FIG. 4 is a perspective view of an inflated form tube (with strong back on top of it) inserted into two precut pipe stubs.
Figure 5A:
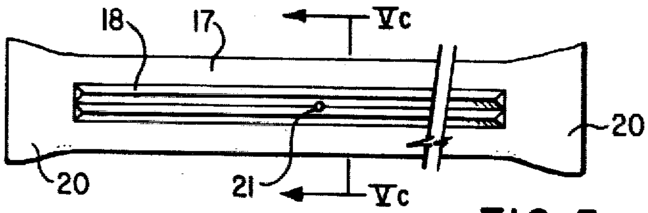
FIG. 5 is a plan view of a deflated form tube of the invention.
Figure 5B:
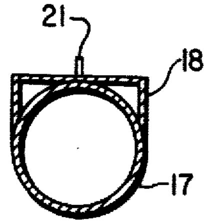

FIG. 5*b* is a cross-section of an inflated form tube—with tube shoulders—taken along the line 5*b*—5*b* of FIG. 4; the strong back is omitted.

Figure 5C:
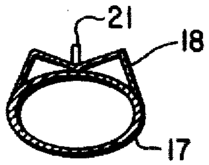

FIG. 5*c* is a cross-section of a deflated form tube—with tube shoulders—taken along the line 5*c*—5*c* of FIG. 5*a*.

Figure 6:
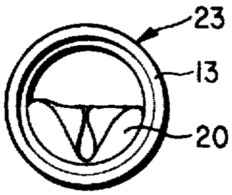

FIG. 6 is an end view of a deflated form tube situated in a pipe stub.

Figure 7:
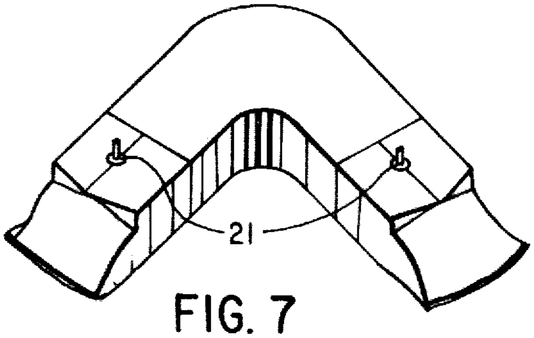

FIG. 7 is an elevated perspective view of another embodiment of the form tube with a centrally located solid transition section located between two inflatable end members.

Figure 8:
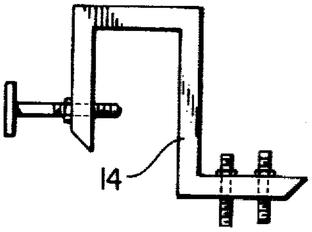

FIG. 8 is a plan view of a stub clamping anchor lying on its side.

Figure 2:
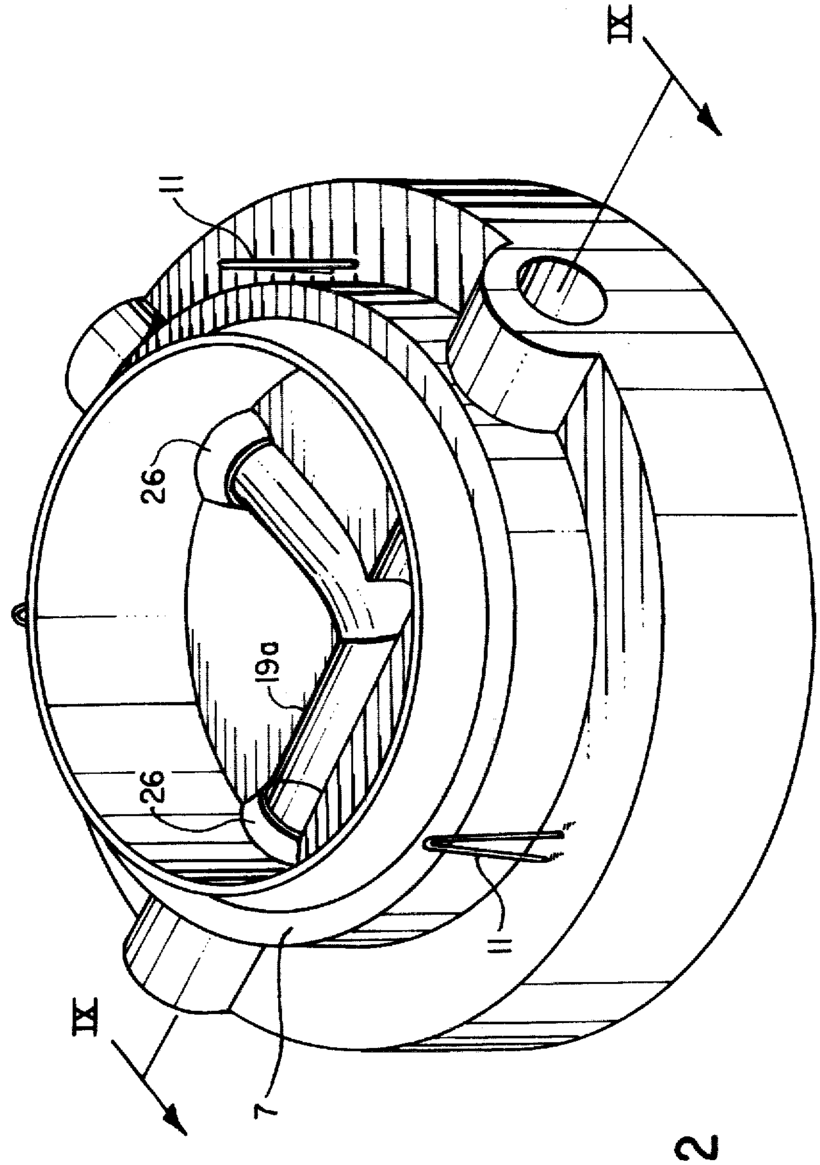
FIG. 2 is a front elevation perspective view of the finished manhole assembly ready for removal and placing in the excavation.
Figure 3:
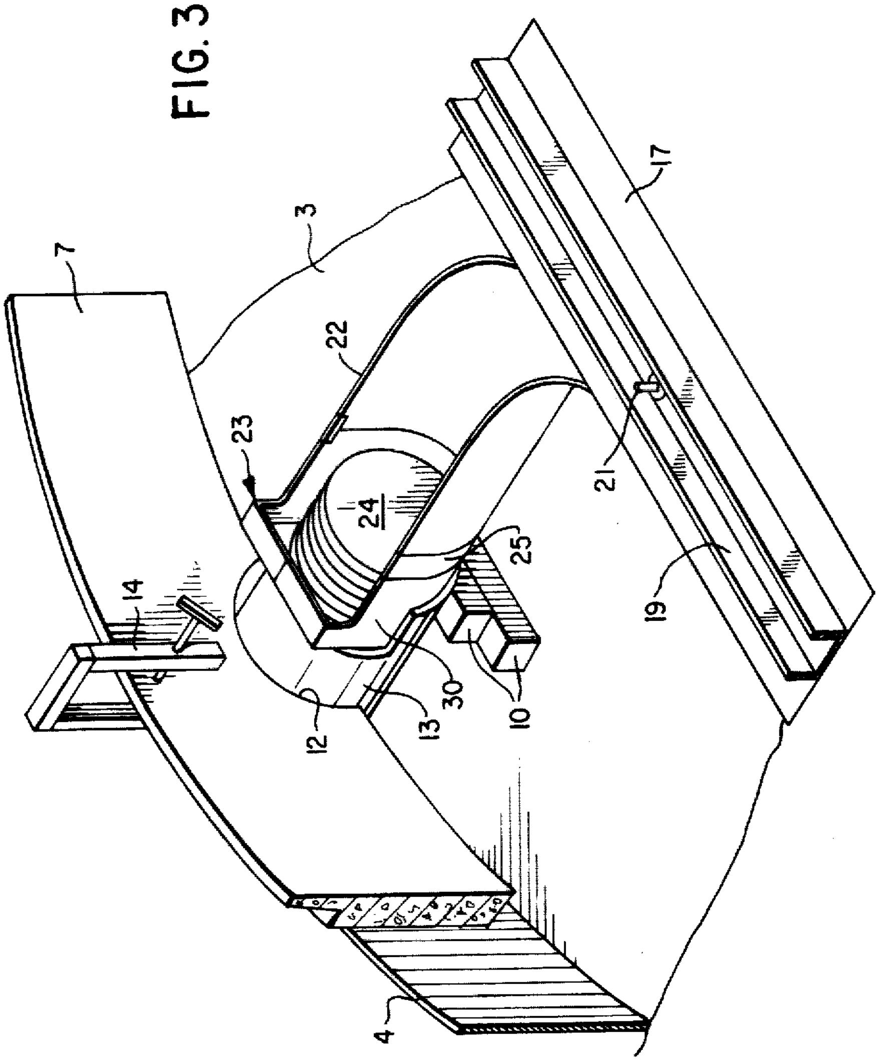
FIG. 3 is a side elevational view taken substantially on the line 3—3 of FIG. 1, showing a "Y" stub and expansion balloon, inflated tube.
Figure 9:
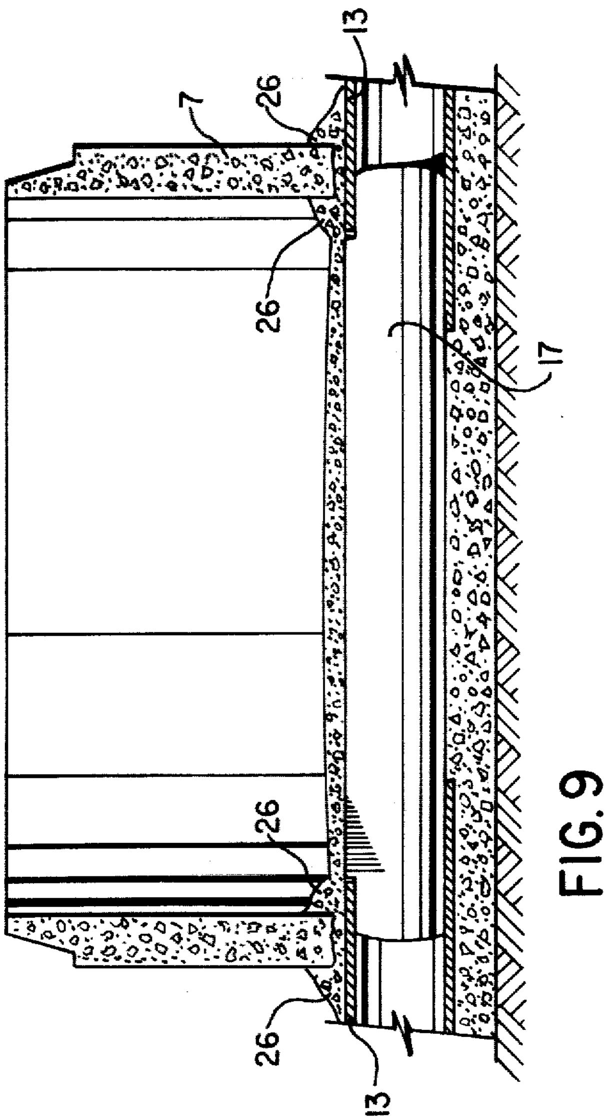

FIG. 9 is a schematic cross-section of a completed manhole assembly taken along the line 9—9 of FIG. 2, showing the pipe stubs and connecting channel in long section.

DESCRIPTION OF THE PREFERRED EMBODIMENTS

The preferred embodiments of the present invention will now be described with reference to the accompanying drawings.

The process of the invention may be done in situ in the excavation or elsewhere, on the work site or off the work site. When the process is done elsewhere than in the excavation, a casting bed is usually used.

Figure 1:
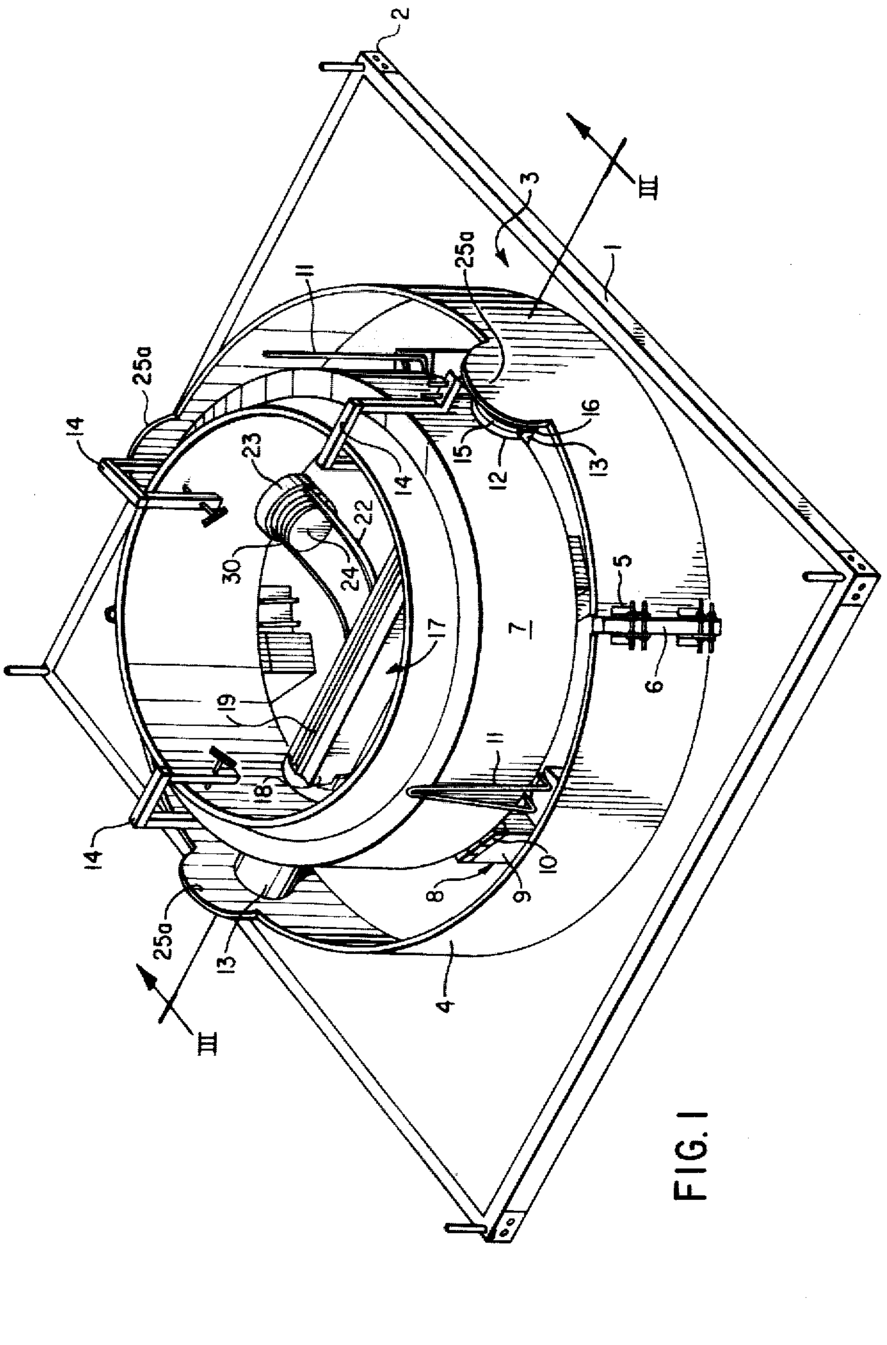
FIG. 1 is a front elevation perspective view of the barrel, casting bed, outside form and stubs; all assembled and ready for the pouring of concrete.

A level spot of ground is chosen and cleared of obstruction. Ground leveling can then be done with shovels and rakes. A steel box frame, 1 in FIG. 1, is put together and adjustment provided by screw levelling jacks at each of its corners, (2 of FIG. 1). These may then be used to level the frame and sand or other suitable material can be added to make up a level floor 3 within the steel frame. Wooden planks are laid down on the steel frame and tamped down. The floor is then swept clean. The outer form 4, usually composed of sheet metal sections, is put together using clamps 5 or other suitable clamping means.

The outer form 4 is removed and put aside for later use. The casting bed is oiled in order that it not be adversely affected by the hardening cement.

A prepared manhole barrel 7 of FIG. 1 is delivered to the site and placed in the center of the casting bed. Its diameter is less than the diameter of the outer form 4. The manhole barrel 7 is supported on suitable supports 8 which can be concrete construction blocks 9 or bricks 10 or both or other suitable objects. The manhole barrel 7 usually rises higher than the base of the outer form 4. Manhole barrel lifting rods 11 are usually inserted having a portion beneath the manhole barrel 7 and another portion extending upwardly beyond the top of the concrete pouring level (FIG. 2). The rod's vertical section rises up in the space between the manhole barrel 7 and the outer frame 4. Two rods of FIG. 2 are usually used to enable the completed manhole barrel assembly to be raised by earth excavating equipment, like large hydraulic diggers. The required stub holes 12 are knocked out of the base of the precast barrel 7. These holes 12 accommodate the pipe stubs that protrude into the manhole assembly. After the holes are knocked out with a sledge hammer, the superfluous reinforcing mesh, of the precast barrel 7, are cut away.

Pipe stubs are prepared by cutting concrete pipes, to the desired shape and size, with a quick cut saw. The pipe stubs 13 are paced into the stub holes 12 in the precast barrel 7 and are fastened to it by suitable means. A stub clamping anchor 14 in FIG. 1 and FIG. 8 can be used to clamp the pipe stub 13 to the precast barrel 7. This anchor 14 also uses steel bands 15 and wires 16 to secure the pipe stub 13. These bands and wires are left in the completed manhole assembly when the concrete has set. The pipe stubs 13 are set to the desired height and grade required for the particular excavation and site where the manhole is to be used. The grade and layout of the pipe stubs are unique to each site. The pipe stubs 13 that are destined to be connected by a straight channel—in the concrete—are joined together by a form tube 17 (in FIG. 1, 4, 5*a*, 5*b*, and 5*c*). The form tube may be completely inflatable or have inflatable ends and a solid central transition section member FIG. 7. The transition section can be made of fibre glass cloth and resin etc.

The form tubes usually have shoulders 18 on the side that faces up. These shoulders 18 form straight upper sides when inflated, (compare FIGS. 5*b* and 5*c*) in the concrete channel, 19*a* of FIG. 2. When in a deflated condition, partial deflation shown in FIGS. 5*a* and 5*c*, side portions 18 turn or fold inwardly relative to their position as shown in FIG. 5*b*. Side portions 18 are secured to the cylindrical central part of the form tube 17 as shown in FIG. 5*b*, 5*c*. The ends of form tube 16 as shown in FIGS. 5*a*, 6 and 7 are wing shaped, having ears which, as shown in FIG. 6 also collapse and fold inwardly which assist in the folding inwardly of side portions 18. The straight sides formed in the channel allows for easier access to the channel, greater volume for water and the straight sides prevent chipping of the concrete. A reinforcing strongback 19 of FIG. 4 and 1 may be placed on the upper side of the form tube 17, but it is not necessary for the process of the invention. The limp deflated form tube ends 20 are inserted into the two pipe stems to be joined, (see FIG. 6) and the form tube 17 is inflated with compressed air.through a valve 21. Subsidiary channels can be made that connect a pipe stub with another channel to form complex channel shapes, such as "Y" shaped channels. In order to do this, rigid channel members 22, often made of fiber glass, are used to join the other pipe stub 23 to the form tube 17. The rigid channel member 22 is placed into the end of the pipe stub 23 and it rests upon an insert 30 that has been placed into the "other pipe stub" 23. This insert 30 can be split at the top or both at the top and bottom. The insert 30 and rigid channel member are secured by the force of an expansion balloon 24. The point where pipe stub 23 meets the rigid channel member 22 can be sealed on the outside by tape 25. Quick setting patching compound is applied to the bottom end transition edge of the rigid channel member 22 to result in a smooth even form when the poured concrete has set. The channel member 22 can be positioned, supported, and held rigid by strongback support clamps (not shown) that are attached to the upper edge of the precast manhole barrel 7.

When the form tubes and rigid channel members are set and secured, the outer form 4 is positioned around the manhole barrel. The outer form frequently has raised sections 25*a* that cover the outward facing pipe stub end, and thus allow concrete to be placed over the top of the pipe stub.

Concrete is poured into the form and vigorous vibration is used to remove entrained air, and thus compact the concrete. Concrete is usually poured up to the upper limit of the outer form 4 and additional concrete 26 of FIG. 2 is shaped over the point of jointure of the pipe stub and manhole barrel 7. This is done on both sides of the manhole barrel. After the concrete is set, the inflatable form tubes 17 are deflated, the form tube shoulders 18 are collapsed inwardly and the strongback 19 slipped out, (where a strongback is used). The form tube 17 can then be pulled through the pipe stub 13 or otherwise removed to be used again on succeeding jobs. The expansion balloon 24, holding the rigid channel member 22 to the pipe other stub 23, (where it is used) is deflated, removed and then the rigid channel member 22 is taken out. It can also be reused on succeeding jobs. The outer form 4 is dismantled and removed and the various clamping anchors are taken away. What is left is a stripped manhole assembly with base that can be removed, to the excavation site, the day after casting. The rods 11 are used to hoist the manhole assembly. Manhole assemblies produced by the process of the invention have smooth sided channels 19*a* of FIG. 2 with smooth shoulders. The points of junction 7 are smooth; there is no buckling due to wavy walls. The smooth walls slope down to the bottom of the channels 19*a* allowing for hosing during maintenance. The channels 19*a* are properly curved to provide even flow and self-flushing.

While the invention has been described and illustrated with respect to a preferred embodiment, it will be understood by those skilled in the art that various changes and modifications may be made without departing from the spirit and scope of the invention and it is intended therefore in the appended claims to cover all such changes and modifications.

The embodiments of the invention in which an exclusive property or privilege is claimed are defined as follows:

1. A method of constructing a manhole base comprising the steps of:

a. providing a substantially level casting bed;

b. supporting a preformed manhole barrel on said bed at a predetermined height thereabove;

c. securing at least two pipe stubs to the barrel at selected peripheral locations thereof and at selected heights relative thereto, said pipe stubs having open interior ends; connecting the interior ends of selected ones of said pipe stubs with an inflatable and deflatable channel form tube by inserting opposed wing shaped ends thereof into selected interior stub ends, followed by inflating said form tube to expand the ends thereof as well as a generally cylindrical intermediate portion thereof including side portions secured outwardly thereon, with said inflated side portions of said intermediate portion forming upper vertical portions of the channel to be formed in the base to be poured;

e. providing an outer form on said casting bed to delimit the outer periphery of said manhole base;

f. pouring concrete within said outer form and within said barrel to a predetermined height;

g. removing the outer form after the concrete has set;

h. deflating said ends and said intermediate portion to collapse said side portions of the form tube away from channel side walls formed by the tube in the concrete; and i. removing said form tube from the base.

2. The method according to claim 1 that further comprises the utilization of a rigid form, for forming complex channels contiguous to the continuous channel in the manhole assembly base.

3. The method according to claim 1, wherein said pipe stubs are secured to said barrel by stub holder means adapted to maintain selected grade and alignment of said stubs during setting of said concrete.

4. The method according to claim 1, wherein said outer form has means for closing off outer ends of said selected pipe stubs to prevent entry therein of poured concrete.

5. Apparatus for use in manufacturing a manhole base including a manhole barrel and having channel means therein comprising:

means for securing pipe stubs to the periphery of said manhole barrel at selected locations relative thereto and relative to a lower surface of said manhole base to be formed;

means for connecting inner ends of selected ones of pipe stubs secured to said barrel periphery, said connecting means including inflatable wing shaped end portions adapted for inflated securement in the ends of said selected pipe stubs during pouring of concrete to form said base, and said connecting means having at least one intermediate inflatable portion between said inflatable ends comprising, when inflated, a generally cylindrical member having side portions secured outwardly thereof which form vertical walls, said side portions forming substantially vertical upper side walls of a continuous channel to be formed in said base, said side portions being collapsable inwardly away from said side walls when said intermediate portion is deflated; and outer form means for delimiting the outer periphery extent of said base.

6. The apparatus according to claim 5, wherein said connecting means includes a reinforcing rib means adapted to be secured to the upper surface of said intermediate portion.

7. The apparatus according to claim 5 or 6, wherein said outer form means includes means for covering outer ends of said pipe stubs during pouring of concrete.

8. A reusable apparatus for forming channels in wet concrete comprising;

a form tube having wing shaped inflatable end portions and an inflatable portion intermediate the end portions;

each said end portion being adapted to inflatably fit into an end of a pipe stub for forming a continuous channel in wet concrete between pipe stubs, said inflatable intermediate portion comprising, when inflated, a generally cylindrical member having substantially triangularly shaped side portions secured outwardly thereof, said side portions forming substantially vertical walls over a portion of the height of a channel to be formed in the wet concrete, said side portions being adapted to fold inwardly away from the formed vertical walls when said intermediate portion is deflated after formation of said channel.

9. The apparatus according to claim 8, including reinforcing rib means secured to the upper surface of said form tube.

* * * * *